(12) United States Patent
Daniel (10) Patent No.: US 8,649,967 B1
(45) Date of Patent: Feb. 11, 2014

(54) UNIFIED ADDRESS ENHANCED LOCATOR SYSTEM AND METHOD FOR PROVIDING COMMUTER INFORMATION

(75) Inventor: Isaac S. Daniel, Miami, FL (US)

(73) Assignee: The F3M3 Companies, Inc.

( * ) Notice: Subject to any disclaimer, the term of this patent is extended or adjusted under 35 U.S.C. 154(b) by 855 days.

(21) Appl. No.: 12/462,992

(22) Filed: Aug. 12, 2009

Related U.S. Application Data (63) Continuation-in-part of application No. 12/456,311, filed on Jun. 15, 2009, now abandoned.

(51) Int. Cl.
*G01C 21/00* (2006.01)
*G05D 1/00* (2006.01)

(52) U.S. Cl.
USPC .............. 701/408; 701/1; 701/117; 701/413; 701/483; 701/414

(58) Field of Classification Search
None
See application file for complete search history.

(56) References Cited

U.S. PATENT DOCUMENTS

| | | | | |
|---|---|---|---|---|
| 6,006,159 | A * | 12/1999 | Schmier et al. ............... | 701/465 |
| 6,374,176 | B1 * | 4/2002 | Schmier et al. ............... | 701/465 |
| 7,082,365 | B2 | 7/2006 | Sheha et al. | |
| 7,493,127 | B2 * | 2/2009 | Morgan et al. ............. | 455/456.5 |
| 7,574,222 | B2 * | 8/2009 | Sawada et al. ............. | 455/456.3 |
| 7,606,663 | B2 * | 10/2009 | Neef et al. ..................... | 701/425 |
| 2002/0069017 | A1 * | 6/2002 | Schmier et al. ............... | 701/213 |
| 2002/0099500 | A1 * | 7/2002 | Schmier et al. ............... | 701/200 |
| 2004/0073468 | A1 * | 4/2004 | Vyas et al. ......................... | 705/8 |
| 2005/0171686 | A1 * | 8/2005 | Davis ............................ | 701/200 |
| 2007/0001904 | A1 | 1/2007 | Mendelson | |
| 2007/0018890 | A1 | 1/2007 | Kulyukin | |
| 2008/0133124 | A1 * | 6/2008 | Sarkeshik ..................... | 701/201 |

FOREIGN PATENT DOCUMENTS

EP WO2010/015934 A1 9/2010

OTHER PUBLICATIONS

International Search Report, PCT/US2011/062072, mailed Jul. 23, 2012, 5 pages, ISA/European Patent Office.

* cited by examiner

*Primary Examiner* — Ian Jen
(74) *Attorney, Agent, or Firm* — Carol N. Green, Esq.

(57) ABSTRACT

The present invention is directed to a unified address enhanced locator system and method for determining commuter information, which utilizes an assigned portable address code permitting individuals to physically locate a home, building, business, landmarks, edifices, and/or set meeting points as well as obtain directions to a geographical location, in townships, neighborhoods, municipalities, cities and/or countries that may or may not employ a formal address scheme using street naming conventions and building numbers. An address code may be assigned to bus stops, taxi stations and railroad terminals and/or any other public transportation stations, such that a requestor may use the unified address enhanced locator system and method to obtain commuter information for a mode of public transportation and to plan his/her commute accordingly.

22 Claims, 5 Drawing Sheets

UNIFIED ADDRESS ENHANCED LOCATOR SYSTEM AND METHOD FOR PROVIDING COMMUTER INFORMATION

PRIORITY CLAIM

This patent application is a continuation-in-part of, and claims priority to: United States Non-Provisional patent application Ser. No. 12/456,311 titled: "A Unified Address Enhanced Locator System and Method" filed Jun. 15, 2009 now abandoned. The entire disclosure of the afore-mentioned patent application is incorporated by reference as if fully stated herein.

I. FIELD OF THE INVENTION

The present invention is directed to a unified address enhanced locator system and method for determining commuter information, which utilizes an assigned portable address code permitting individuals to physically locate a home, building, business, landmarks, edifices, and/or set meeting points as well as obtain directions to a geographical location, in townships, neighborhoods, municipalities, cities and/or countries that may or may not employ a formal address scheme using street naming conventions and building numbers. An address code may be assigned to bus stops, taxi stations and railroad terminals and/or any other public transportation stations, such that a requestor may use the unified address enhanced locator system and method to obtain commuter information for a mode of public transportation and to plan his/her commute accordingly.

II. PRIOR ART

Several countries, e.g. Costa Rica and Dubai, do not use a formal address scheme as an identifier of the geographical location of a home, building, business, landmark or other edifices (collectively "buildings"). As such, there are no unified street names, building numbers or postal codes to aid in physically locating a building. In these instances, reference points are often used to connote the general direction one must travel to locate an intended destination. For example, in Costa Rica, a building's pseudo "address" may be listed as "Del Spoon San Pedro 50M Este Cuidad: San Jose," for which the English translation is "50M East from [the building known as] The Spoon, San Jose." City residents who are familiar with the neighborhood's reference points can easily locate the intended destination. However, visitors and/or new residents who are unfamiliar with the neighborhood will find it challenging to navigate their way around these cities. Thus, there is a need for a uniformed address system and method wherein individuals can locate buildings, set meeting points in townships, neighborhoods, cities and/or countries that do not employ a formal address scheme using street naming conventions, building numbers, and/or postal codes.

Quite often, commuters of public transportation systems experience unexpected delays after arriving at the various train stations, taxi stands or bus terminals (collectively "stations") for a scheduled departure. The delay may be unavoidable, but not necessarily appreciated by the commuter, especially in inclement weather. It would be helpful if the commuter could receive advance notice of any delays or early arrivals prior to arriving at the station. In this manner, the commuter could estimate their commute with a higher degree of accuracy, minimize the wait and provide advance notification of any delays or early arrivals to any interested party(ies) who may be impacted by the commuter's arrival or departure, e.g. a supervisor, a receiving party, family and/or friend(s).

Tourists are often intimidated by public transportation systems in unfamiliar cities and many decline to use the same to travel to or from tourist attractions, landmarks and/or other destinations. This problem is compounded when the tourist's native language differs from the city being visited, where fear or pride may prevent the tourist from asking for directions and/or other relevant travel information. Sightseeing is also hampered by misinterpretation of directions, miscalculation of commute times, unknown bus and/or train schedules. Accordingly, many tourists decline to venture beyond a certain perimeter, or they scale their sightseeing to fit their comfort zone rather than dealing with the unfamiliarity of a city's public transportation system. Thus, it would be helpful for tourists to find a method of independently navigating unfamiliar cities, where they can easily obtain commuter information for public transportation systems, e.g. schedules, routes, transportation options available for travel to/from an intended destination in an easy, efficient and comprehensive manner.

This invention satisfies these long felt needs and solves the foregoing limitations of the prior art in a new and novel manner.

SUMMARY OF THE INVENTION

A primary objective of the invention is to provide a unified address enhanced locator system and method such that commuter information to or from a home, building, business, landmarks and or other edifices can be readily determined.

Another objective of the invention is to provide commuter information based on an assigned portable address code.

Yet another objective of the invention is to provide a system and method for allowing a requestor to obtain commuter information, which would include commuter information for at least one public transportation unit, e.g. a bus, train or taxi cab service, to or from a point of interest.

Still yet another objective of the invention is to provide a system and method for allowing a requestor to obtain commuter information, which includes commuter information for at least one public transportation unit, based on requestor's current geographical location.

Another objective of the invention is to provide a system and method for providing commuter information where the address code for the public transportation unit or landmark for which commuter information is desired may be known or unknown.

Another objective of the invention is to provide a system and method for providing commuter information based on a known landmark.

The present invention overcomes the limitations of the prior art by providing a unified address enhanced locator system and method for providing commuter information. In one embodiment of invention, the address code for the public transportation unit or landmark for which commuter information is desired is known. In that embodiment, the unified address enhanced locator system and method of providing commuter information using a computer processor comprises of receiving a request for access to a unified address enhanced locator system from a requestor; providing access to the unified address enhanced locator system; receiving a request for commuter information; receiving an address code for a select public transportation unit or landmark; determining the commuter information for the address code for the select public transportation unit or landmark; and publishing the commuter information for the address code for the select public transportation unit or landmark to at least one party.

In an alternate embodiment of the invention, the address code for the public transportation unit maybe unknown. However, the commuter information may still be derived using requestor's current geographical location. In that embodiment, the system and method of providing commuter information using a computer processor comprises of: receiving a request for access to the unified address enhanced locator system; providing access to the unified address enhanced locator system; receiving a request for commuter information; requesting address code for the public transportation unit for which commuter information is being requested; receiving originating address information for said requestor; translating the originating address information to a physical geographical location; generating and publishing a map of the physical geographical location, which includes at least one address code for any public transportation units within a predetermined radius; receiving the address code for a select public transportation unit; determining the commuter information for the address code for the select public transportation unit; and publishing the commuter information for the address code for the select public transportation unit to at least one party.

In yet another embodiment of invention, the address information for a point of interest, e.g. a landmark like Walt Disneyworld, Florida, is known but the available public transportation units to/from the point of interest may be unknown and consequently their address codes are similarly unknown. In this embodiment, the unified address enhanced locator system and method of providing commuter information using a computer processor comprises of receiving a request for access to a unified address enhanced locator system from a requestor; providing access to the unified address enhanced locator system; receiving a request for commuter information relating to a point of interest; requesting point of interest's address information; receiving point of interest's address information; generating a map of a predetermined radius encompassing the point of interest, determining commuter information for at least one address code for an available public transportation unit that services and provides access to the point of interest; and publishing the map of the predetermined radius, which includes commuter information for at least one address code for an available public transportation unit that services and provides access to the point of interest.

If requestor needs more specific commuter information for available public transportation units to/from the point of interest based on requestor's address information in relation to the published commuter information, the invention can provide this information. As such, the system and method further comprises of requesting and receiving address information for requestor; determining the optimum route and/or alternate routes to/from the point of interest based on requestor's address information; publishing commuter information for at least one and/or a plurality of address codes for available public transportation units that services or provides nearby access to the point of interest. If requestor's address information is unknown, it may be determined by receiving the address information from requestor's wireless device equipped with location determining means and translating requestor's address information to geographical location.

In these embodiments, the address code may comprise of any one or more of the following: numbers, characters, alphabets, alphanumeric characters, drawings, or any other designations that maybe used to designate a unique identifier that are well known and used in the arts. Commuter information may include but is not limited to any one or more of the following: routes, bus numbers, bus names, train names, train numbers, arrival schedules, departure schedules, delayed schedule information, advanced arrival schedule, updates to arrival schedule, updates to departure schedules, peak hour schedules, non-peak hour schedules, weekday schedules, weekend schedules, holiday schedules, ticket offices, geographical location of stations, address codes for stations, and available connections to other public transportation units, or any other commuter information that is well known and used in the arts.

Address information may include but is not limited to any one or more of the following: an address code, a residence, name of a corporate entity, building name, building description, building alias(es), street name, street alias(es), floor number, suite number, apartment number, room number, landmark, government agency, government building, municipalities, municipal buildings, location information relative to at least one other known landmark, an absolute geographical location, post office, postal code, township, neighborhood, city, county, province, country or any other address information that is well known and used in the arts. A corporate entity may include any one or more of the following: partnership, corporation, sole proprietorship, individuals doing business as a corporate entity, associations, professional associations, limited liability company, limited liability partnership, a not for profit entity, a for profit entity, an agency, an organization or any other corporate designations that are well known and used in the arts. A public transportation unit may include but is not limited to any one or more of the following: a bus, taxi, train, subway, heliport, seaport, ferry or an airport or any other known public transportation used in the arts.

The commuter information may be published to any one or more of the following: a requestor, a member, a non-member, an owner of an address code, other participating member(s), a corporate entity, a municipality, or government agency, a software application or a designated party(ies) as defined by requestor to receive requestor's commuter information. A requestor may include any one or more of the following: an individual, a participating member, a non member, a corporate entity, or a software application. If needed, the unified address enhanced locator system and method can provide periodic updates of the commuter information to requestor on a predefined schedule, e.g. updates at fifteen (15), ten (10), and/or five (5) minutes, prior to arrival or departure of the public transportation unit. As such, the system and method may forward the commuter information and/or periodic updates to one or more designated parties as defined by requestor to receive requestor's commuter information and/or periodic updates.

Requestor's address information may include but is not limited to: originating or destination information, such that directions may be derived either to or from the known point of interest. Point of interest may include but is not limited to any one or more of the following: an address code, a residence, name of a corporate entity, building name, building description, building alias(es), street name, street alias(es), floor number, suite number, apartment number, room number, city, landmark, government agency, government building, municipality and municipal buildings, location information relative to at least one other known landmark, an absolute geographical location, post office, postal code, street name, township, neighborhood, city, county, province or country, or another member's designated entity.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF THE PREFERRED EMBODIMENT

The following discussion describes in detail an embodiment of the unified address enhanced locator system 10 and method 12 (and variations of that embodiment). However, this discussion should not be construed, as limiting the invention to those particular embodiments, as practitioners skilled in the art will recognize numerous other embodiments as well. For definition of the complete scope of the invention, the reader is directed to the appended claims. Turning now descriptively to the drawings, in which similar reference characters denote similar elements throughout the several views.

Figure 1:
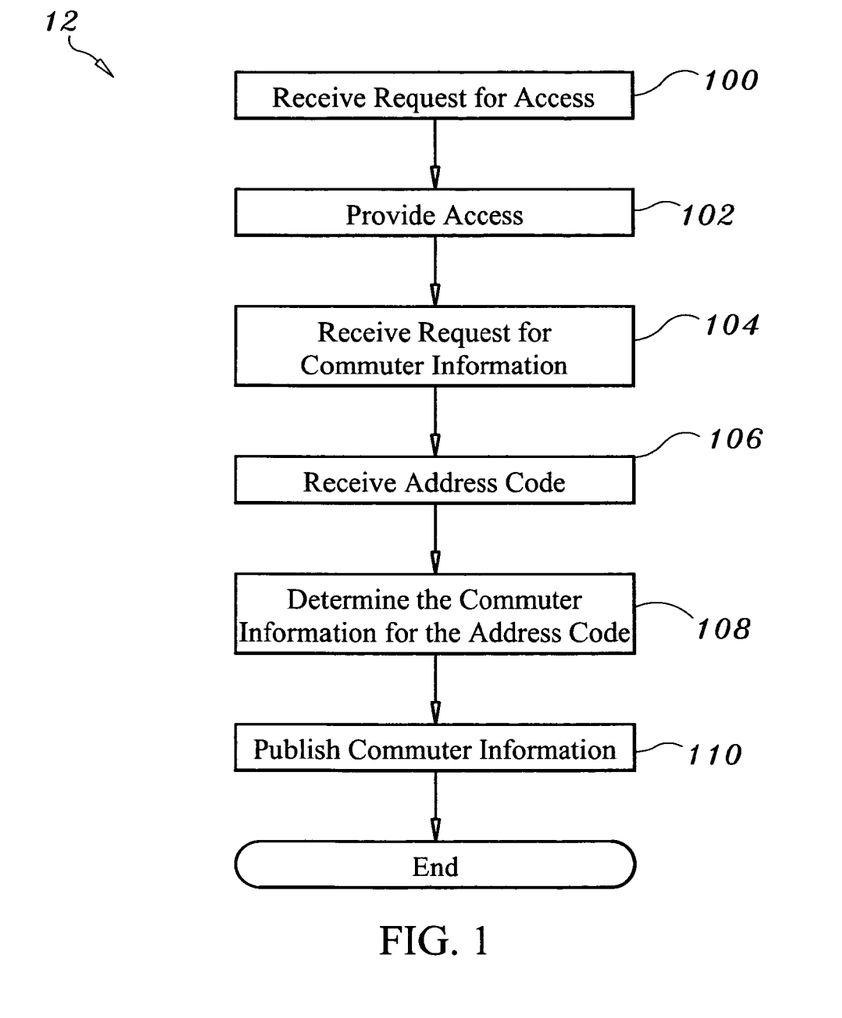
FIG. 1 is a sample flowchart of an exemplary method of providing commuter information to a requestor using a computer processor according to an embodiment of the present invention.

FIG. 1 is a sample flowchart of a method 12 of providing commuter information 14 (not shown) to a requestor 16 (not shown) using a computer processor 17 (not shown) according to an embodiment of the present invention. In this embodiment, the address code 18 (not shown) for the public transportation unit 20 (not shown) and/or landmark 22 (not shown) for which commuter information 14 is desired is known. Commuter information 14 (not shown) may include, but is not limited to any one or more of the following: routes, bus numbers, bus names, train names, train numbers, arrival schedules, departure schedules, delayed schedule information, advanced arrival schedule, updates to arrival schedule, updates to departure schedules, peak hour schedules, non-peak hour schedules, weekday schedules, weekend schedules, holiday schedules, ticket offices, geographical location 24 (not shown) of stations, assigned portable address codes 18 (not shown) for stations, and available connections to other public transportation units 20, 20', 20" (not shown). Commuter information 14 (not shown) may be requested by a requestor 16 (not shown), which may include any one of the following: an individual, a participating member, a non member, a corporate entity 26 (not shown), or a software application.

A public transportation unit 20 (not shown) may include but is not limited to any one or more of the following: a bus, taxi, train, subway, heliport, seaport, or an airport, or any units that are known and used in the arts. The invention is therefore useful in remote cities where a public transportation unit 20 (not shown) may include a heliport, seaport, or airport services. The invention is similarly useful in big cities with large airports servicing various carriers, where select commuter information 14 regarding, e.g. the airport, may be available, like directions to/from the airport, proximity to bus stops or train stations, even if all flight scheduling information for the various carriers are unavailable.

Requestor 16 (not shown) may access the system 10 using a Wireless LAN ("WLAN") device 28 via a user interface 30 (not shown). The system 10 receives the request for access to the unified enhanced address locator system 10 (step 100) and provides access to the unified enhanced address locator system 10 (step 102). Requestor 16 may then request commuter information 14 (not shown) for a known address code 18 for a select public transportation unit 20, e.g. a bus station within the neighborhood, and/or known landmark 22 (not shown). The system 10 receives the request for commuter information 14 (step 104) where requestor 16 may submit the known address code 18 directly to the system 10. The system 10 receives the known address code 18 (step 106) for the select public transportation unit 20, or landmark 22, determines the commuter information 14 (step 108) for the address code 18 and publishes the commuter information 14 (step 110) for the address code 18 for the select public transportation unit 20 or landmark 22 to at least one party. The commuter information 14 may be published to any one or more of the following: a requestor 16, a member, a non member, an owner of an address code 18, other participating member(s), a corporate entity 26, a municipality, government agency, or a software application.

Figure 2:
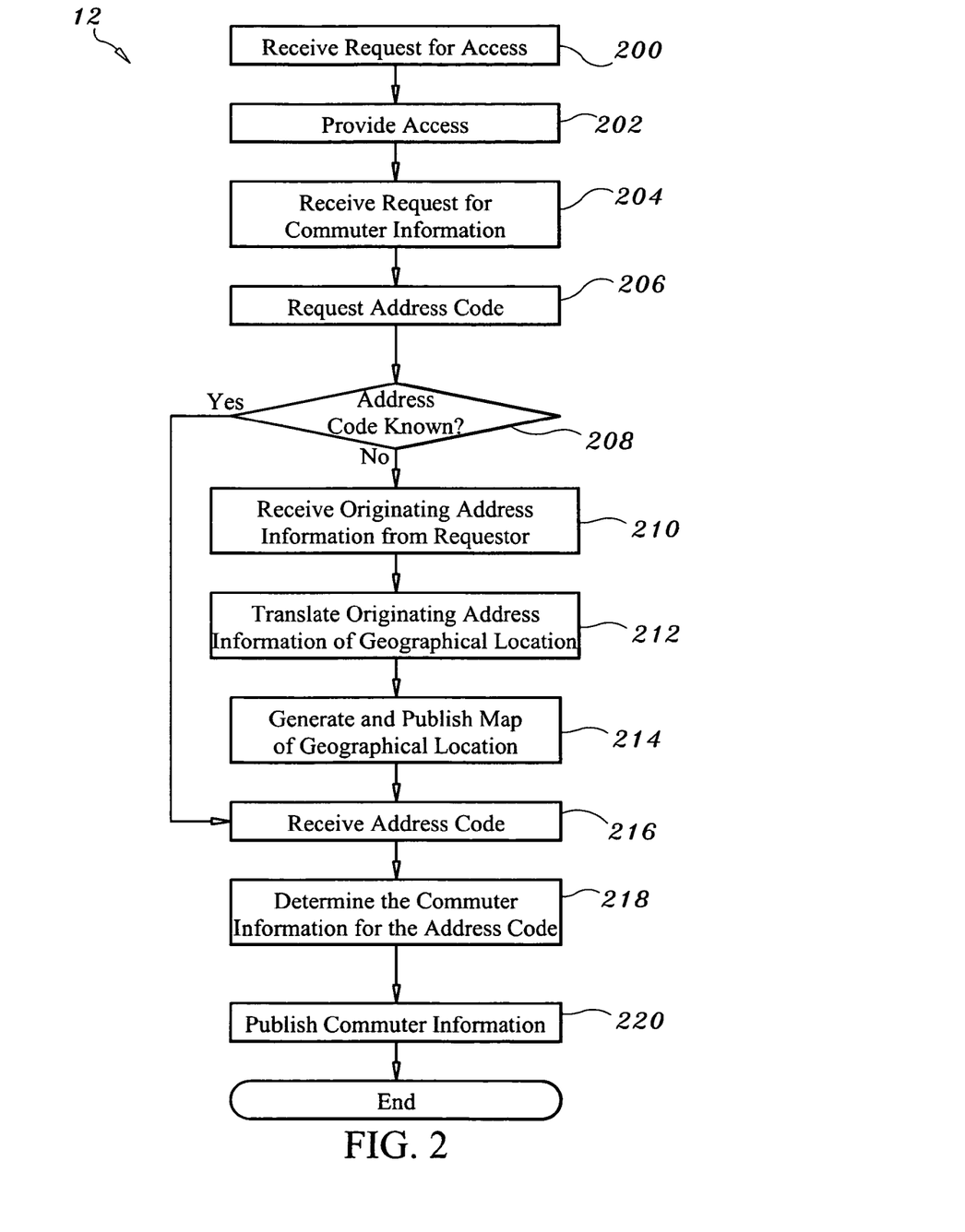
FIG. 2 is a sample flowchart of an exemplary method of providing commuter information using a computer processor according to an alternate embodiment of the present invention.

FIG. 2 is a sample flowchart of an exemplary method 12 of providing commuter information 14 using a computer processor 17 (not shown) according to an alternate embodiment of the present invention. In this embodiment, the address code 18 for the public transportation unit 20 maybe unknown. Certain WLAN devices 28, 28' maybe equipped with location determining capabilities employing GPS technology from which the WLAN device's geographical location 24 (not shown) may be determined and by extension requestor 16. As such, the system 10 receives the request for access to the system 10 from a requestor 16 (step 200), provides access to the system 10 (step 202) and receives the request for commuter information 14 (step 204) in like manner as in steps 100-104 of FIG. 1.

The system 10 may request the address code 18 from requestor 16 (step 206). If the address code 14 is unknown (step 208), the latitude and longitude coordinates of the geographical location 24 (not shown) obtained from the WLAN device 28 maybe used to determine requestor's originating address information 32 (not shown). As such, the system 10 receives requestor's originating address information 32 (not shown) (step 210) from requestor 16 and translates the originating address information 32 (step 212) to a physical geographical location 24 used to generate and publish a map 34

(not shown) of the physical geographical location 24 (step 214), within a predetermined radius 36 (not shown). The system 10 may be programmed to display a predetermined radius 36 of certain mileage, e.g. 0.5, 1 or 1.5 miles, or any other appropriate mileage for the displayed map 34. The generated map 34 (not shown) may publish a plurality of assigned portable address codes 18, 18', 18" for each public transportation unit 20 in the nearby vicinity from which requestor 16 may choose the address code 18 for the select public transportation unit 20 of his/her choice for which commuter information 14 is desired.

If the address code 18 is known, the system 10 may proceed directly from step 208 to 216 to receive the address code 18 for the select public transportation unit 20 (step 216) and determine (step 218) and publish the commuter information 14 (step 220) for the address code 18 for the select public transportation unit 20. The commuter information 14 may be published to any one or more of the following: a requestor 16, a member, a non-member, an owner of an address code 18, other participating member(s), a corporate entity 26 (not shown), a municipality, or government agency, a software application. The system 10 and method 12 may provide periodic updates 38 (not shown) of the commuter information 14 to requestor 16. Additionally, the system 10 and method 12 may forward the commuter information 14 and/or periodic updates 38 to designated parties as defined by requestor 16 to receive requestor's commuter information 14. Requestor 16 may provide the list of designated parties for notification by a user interface 30 via their WLAN device 28. In this manner, the appropriate parties may be notified of any delays, early arrivals or changes to the public transportation unit's schedule.

Figure 3A:
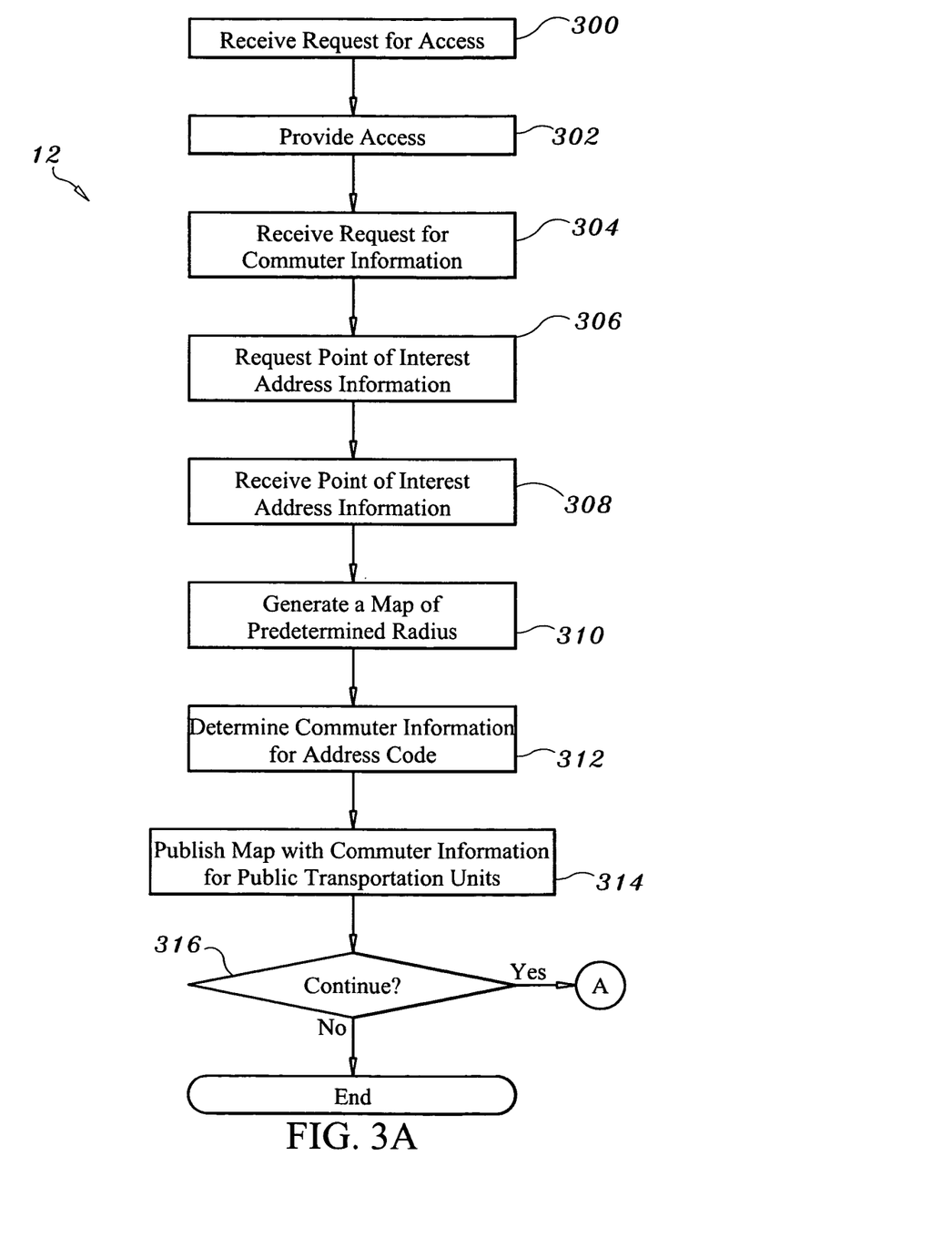
FIG. 3A is a sample flowchart of an exemplary method of providing commuter information using a computer processor according yet another embodiment of the present invention.

FIG. 3A is a sample flowchart of an exemplary method 12 of providing commuter information 14 using a computer processor 17 (not shown) according to yet another embodiment of the present invention. In this embodiment, requestor 16 seeks commuter information 14 to or from a known point of interest 40 (not shown), e.g. a famous landmark 22, where a plurality of available public transportation units 20, 20', 20" exist but their address codes 18, 18' maybe unknown. Here, the unified address enhanced locator system 10 receives the request for access (step 300) and provides access to the system 10 (step 302) in like manner as in steps 100-102; and 200-202 of FIGS. 1 & 2, respectively. The system 10 receives a request for commuter information 14 (step 304) for the point of interest 40 and may request the point of interest's address information 32 (step 306), e.g. name or geographical location 24.

The system 10 receives the point of interest's address information 32 (step 308), generates a map 34 of the predetermined radius 36 (step 310) surrounding the point of interest 40 and determines the commuter information 14 (step 312) for at least one address code 18 for available public transportation units 20, 20', 20" that services the point of interest 40. The system 10 publishes a map 34 of the predetermined radius 36, which includes commuter information 14 (step 314) for address codes 18, 18', 18" for available public transportation units 20, 20', 20" that services the point of interest 40 to at least one party. Here too, the commuter information 14 and/or the periodic updates 38 (not shown) may be published to any one or more of the following: a requestor 16, a member, a non member, an owner of an address code 18, other participating member(s), a corporate entity 26, a municipality, government agency, or a software application. If requestor needs more specific commuter information 14 for available public transportation units 20, 20' to/from the point of interest based on requestor's address information 32 in relation to the published commuter information 14, requestor may continue to request and obtain the same (step 316). Alternatively, if requestor 16 is satisfied with the commuter information 14 provided requestor 16 may end the session.

Figure 3B:
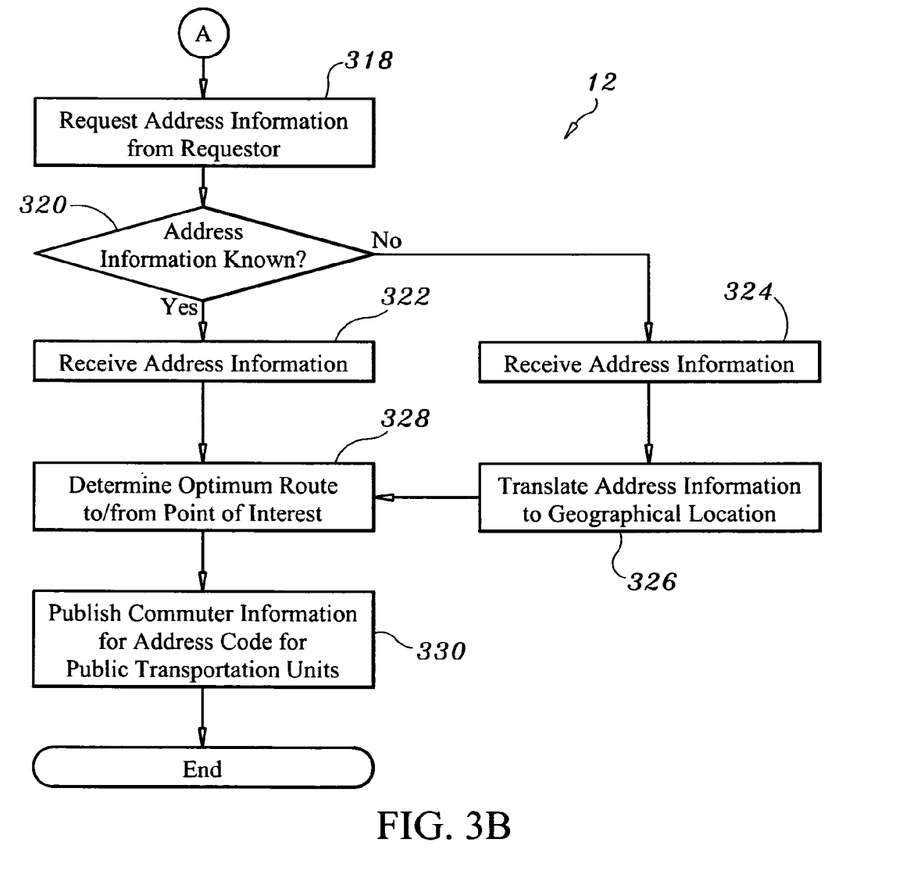
FIG. 3B is a sample flowchart of an exemplary method of providing specific commuter information using a computer processor according to an embodiment of the present invention.

FIG. 3B is a sample flowchart of an exemplary method 12 of providing specific commuter information 14 using a computer processor 17 (not shown) according to an embodiment of the present invention. If requestor 16 chose to continue to obtain specific commuter information 14 (step 316) the system 10 may request the address information 32 (step 318) from requestor 16, i.e. originating or destination address information 32, to be used as a reference point 42 (not shown) to compute customized commuter information 14 for an address code 18 for a select public transportation unit 20 to or from the point of interest 40.

If requestor's address information 32 is known (step 320), the system 10 receives the address information 32 (step 322) and uses it to determine the optimal route 44 and/or alternate routes 44, 44' accessing the point of interest 40 via available public transportation units 20, 20' servicing the point of interest 40. Alternatively, if requestor's address information 32 is unknown, the system 10 receives requestor's address information 32 (step 324) from the WLAN device 28, translates requestor's address information 32 to a geographical location 24 (step 326), which is used to determine an optimal route 44 and/or other alternate routes 44 to or from the point of interest 40 (step 328) based on requestor's geographical location 24 via available public transportation units 20, 20' servicing the point of interest 40. The system 10 publishes commuter information 14 for at least one and/or a plurality of address codes 18, 18', 18" for public transportation units 20, 20', 20" (step 330) servicing the point of interest 40 based on requestor's address information 32.

The address information 32 may include but is not limited to any one or more of the following: an address code 18, a residence, name of a corporate entity 26, building name, building description, building alias(es), street name, street alias(es), floor number, suite number, apartment number, room number, city, landmark 22, government agency, government building, municipality and municipal buildings, location information relative to at least one other known landmark 22, an absolute geographical location 24, post office, postal code, street name, township, neighborhood, city, county, province or country, or another member's designated entity. The point of interest 40 may include but is not limited to any one or more of the following: an address code 18, a residence, name of a corporate entity 26, building name, building description, building alias(es), street name, street alias(es), floor number, suite number, apartment number, room number, city, landmark 22, government agency, government building, municipality and municipal buildings, location information relative to at least one other known landmark 22, an absolute geographical location 24, post office, postal code, street name, township, neighborhood, city, county, province or country, or another member's designated entity.

Figure 4:
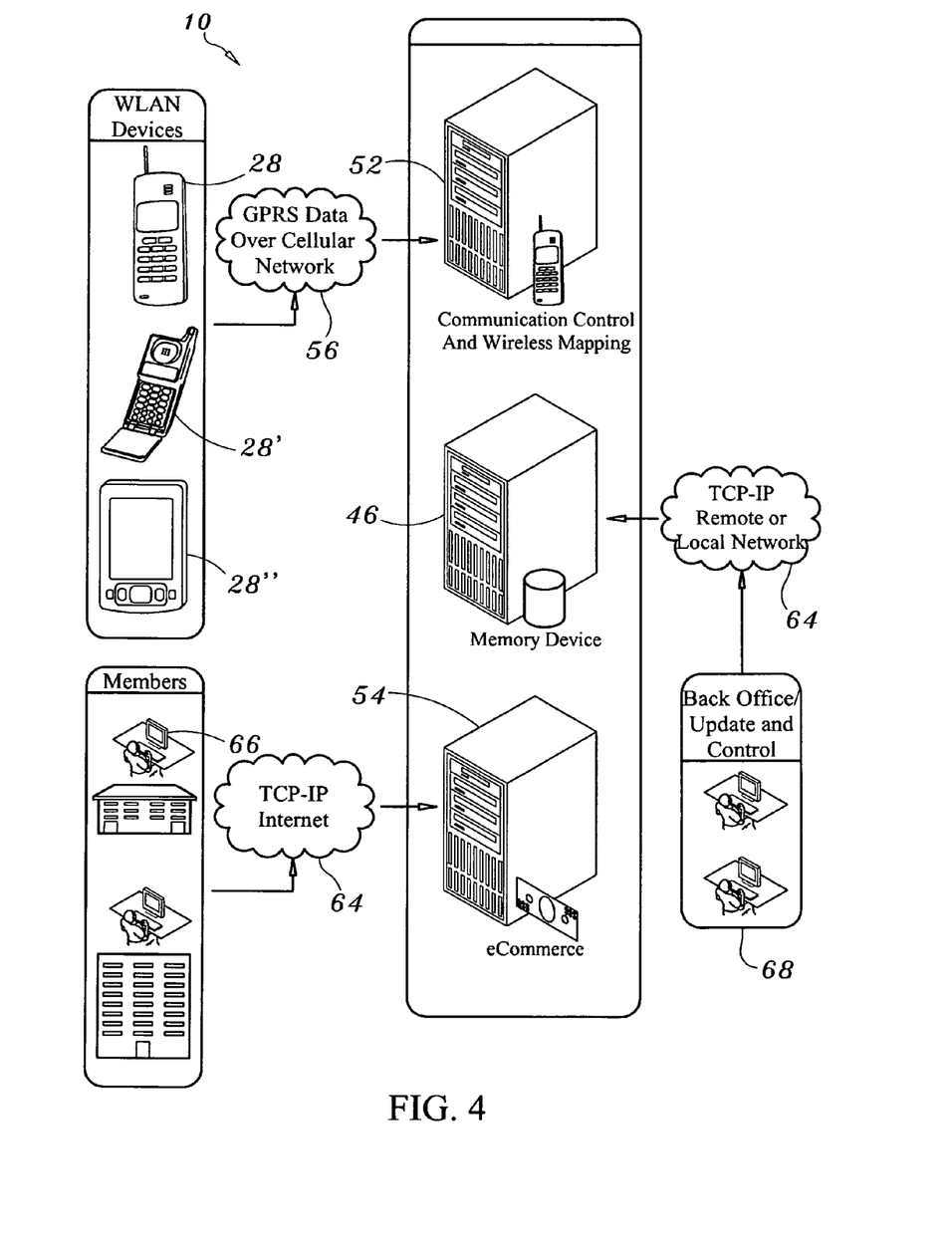
FIG. 4 is a network diagram illustrative of an exemplary embodiment of the system of the invention.

FIG. 4 is a network diagram illustrative of an exemplary embodiment of the system 10 of the invention. The system 10 comprises of a memory device 46 and at least one central processor 17 (not shown), disposed in communication with the memory device 46, wherein the central processor 17 includes instructional code 50 (not shown) and is configured to perform the various system 10 functions to practice the invention. For example, the central processor 17 is configured to receive at least one request for access to the unified address enhanced locator system 10; provide access; receive requests for commuter information 14; request address code 18 for at least one public transportation unit 20; receive originating address information 32 for a requestor 16; translate originating address information 32 to a physical geographical location 24; generate and publish a map 34 of the physical geographical location 24, which includes address codes 18, 18' for any public transportation units 20, 20' within a predetermined radius 36; receive at least one address code 18 for select public transportation units 20, 20'; determine commuter information 14 for address codes 18, 18' for public transportation units 20, 20'; and publish commuter information 14 for address codes 18, 18' for public transportation units 20, 20'. The central processor 17 is also configured to request and receive point of interest address information 32; determine address codes 18, 18' for at least one or a plurality of public transportation units 20, 20', publish address codes 18, 18', as well as any other system 10 functions.

Illustratively, the two servers i.e. the communications control and wireless mapping server 52, and the e-Commerce server 54, as well as the memory device 46 are illustrated as three separate systems 10 components. However, it is understood by those skilled in the arts that all three system 10 components may alternatively have been combined into a single unitary system 10, capable of performing each of the three illustrated functions, i.e. the communications control and wireless mapping function, managing the e-commerce functions and the storage functions of a memory device 46.

As previously discussed a user may use various WLAN devices 28, 28', 28" to communicate with the system 10, e.g. to request commuter information 14 (not shown), and/or any other functions that are well known and used in the arts. The user interface 30 (not shown) may be customized for the specific WLAN devices 28, 28', 28" as they communicate with the communications control and wireless mapping server 52 exchanging Global Packet Radio Service ("GPRS") data 56 over a cellular network 58 (not shown) or any other wireless data format that are well known and used in the arts.

The communications control and wireless mapping server 52 manages the flow of information to and from the user, managing requests for such services as requests for commuter information 14 (not shown), generating and publishing maps 34, 34' as well as any other mapping and control functions of the system 10 of the invention. When a requestor requests commuter information 14 (not shown) and provides for example, a portable address code 18 (not shown) to the system 10, the communications control and wireless mapping server 52 receives the request for commuter information 14 for an address code 18 for a select public transportation unit 20, determines the commuter information 14 for the address code 18 and publishes the commuter information 14 for the address code 18 for the select public transportation unit 20 to at least one party. The commuter information 14 may be published solely as, or as a combination of any one or more of the following: i.e. as text, graphical format, charts, or audio and/or any other type of communications method that is well known and used in the arts.

As illustrated, the communications control and wireless mapping server 52 as well as the e-Commerce server 54 each comprises of an operating system 60 (not shown) and a central processor 17 (not shown) in communication with the memory device 46, which uses an electronic database 62 (not shown) to store, e.g. commuter information 14, public transportation unit's address codes 18, 18', maps 34, 34', etc. It is understood that the memory device 46 may comprise of any computer-readable storage media devices, e.g. a CD-ROM, flash drives, electronic database 62 (not shown) and/or any other storage media devices that are well known and used in the arts. The memory device 46 may also include instruction code 50 for implementing and supporting the system 10 of the invention. The central processors 17, 17' (not shown) of the communications control and wireless mapping server 52 and e-Commerce server 54 include instruction code 50 (not shown), and are configured to implement and support the system 10 and the various methods 12, 12' of the invention, which may include but is not limited to: receiving and storing data, receiving requests, providing access, performing searches, determining commuter information 14, generating maps 34, 34' publishing commuter information 14, as well as any other system 10 functions that are required to practice the invention.

Participating members may access and communicate with the system 10 of the invention, e.g. the e-Commerce server 54, via Internet protocol 64, such as TCP-IP, using their web access devices e.g. cellular phones, i.e. I-Phones, BlackBerry®, smart phones, or a WLAN device 28, e.g. PDAs, or personal computer 66 for entering and displaying information. Requestor may access the system 10 to perform conventional e-commerce activities that are well known and used in the arts, e.g. register with the system 10, make payments for access fees, review invoices, etc. Also, one skilled in the art will appreciate that various communication channels may be used to interconnect the system 10 via the Internet protocol 64 with the users' personal computer 52 such as a wide area network, or point-to-point, dial-up connections, cable network, fiberoptics, and DSL high speed connections or any other communications means that are well known and used in the arts.

The system 10 will require the creation and or uploading of maps 34, 34' designation of address codes 18, 18' for the various public transportation units 20, 20' as well as the maintenance of the main electronic database 62 (not shown) to register and store maps 34, 34', address codes 18, 18' and commuter information 14 as well as any other information to be either programmed in or manually inputted into the electronic database 62 (not shown). The inputting process is a function of the back office 68, which will either input the entries and/or updates manually, or program the servers 52, 54 to automatically do so. The back office 68 may access and/or communicate with the servers 52, 54 using TCP-IP communications protocol 64 via remote or local area network systems 58 (not shown), or any other Internet protocol 64 that are well known and used in the arts.

While the invention has been described in connection with specific embodiments and applications, the inventor does not intend to restrict the description to the examples shown. Persons skilled in the art will recognize that the above system 10 and methods 12, 12' may be modified or changed without departing from the general scope of the present description, the intention of the inventor being to include all such modifications and alterations in so far as they come within the scope of the appended claims or the equivalents thereof. It will be understood that each of the elements described above, or two or more together may also find a useful application in other types of methods 12, 12' differing from the type described above.

While certain novel features of this invention have been shown and described and are pointed out in the annexed claims, it is not intended to be limited to the details above, since it will be understood that various omissions, modifications, substitutions and changes in the forms, method 12, steps and system 10 illustrated and in its operation can be made by those skilled in the art without departing in any way from the spirit of the present invention.

What is claimed is:

1. A method of providing commuter information using a computer processor comprising:
   (a) receiving a request for access to a unified address enhanced locator system from a requestor;
   (b) providing access to the unified address enhanced locator system;
   (c) receiving a request for commuter information;
   (d) requesting and receiving point of interest's address information;
   (e) generating a map of a predetermined radius encompassing the point of interest;
   (f) determining commuter information that includes schedules for at least one address code for an available public transportation unit that services and provides access to the point of interest;
   (g) publishing said map, which includes commuter information for at least one address code for an available public transportation unit that services the point of interest; and
   (h) selective publishing of periodic updates on a predefined schedule of commuter information that includes schedules for the at least one address code for the available public transportation unit to designated parties as defined by the requestor to receive requestor's commuter information.

2. The method of claim 1, further comprising:
   (a) requesting and receiving address information for requestor;
   (b) determining the optimum route to or from the point of interest based on requestor's address information; and
   (c) publishing commuter information for at least one or a plurality of address codes for available public transportation units that services the point of interest.

3. The method of claim 2, further comprising:
   (a) receiving the address information from requestor's wireless device equipped with location determining means; and
   (b) translating said address information to geographical location.

4. The method of claim 1, wherein commuter information includes any one or more of the following: routes, bus numbers, bus names, train names, train numbers, arrival schedules, departure schedules, delayed schedule information, advanced arrival schedule, updates to arrival schedule, updates to departure schedules, peak hour schedules, non-peak hour schedules, weekday schedules, weekend schedules, holiday schedules, ticket offices, geographical location of stations, address codes for stations, and available connections to other public transportation units.

5. The method of claim 1, wherein requestor's address information includes: originating or destination information.

6. The method of claim 1, wherein the address information includes any one or more of the following: an address code, a residence, name of a corporate entity, building name, building description, building alias, street name, street alias, floor number, suite number, apartment number, room number, landmark, government agency, government building, municipalities, municipal buildings, location information relative to at least one other known landmark, an absolute geographical location, post office, postal code, township, neighborhood, city, county, province or country.

7. The method of claim 6, wherein the corporate entity includes any one or more of the following: partnership, corporation, sole proprietorship, individuals doing business as a corporate entity, associations, professional associations, limited liability company, limited liability partnership, a not for profit entity, a for profit entity, an agency, or an organization.

8. The method of claim 1, wherein a public transportation unit includes any one or more of the following: a bus, taxi, train, subway, heliport, seaport, ferry or an airport.

9. The method of claim 1, wherein the point of interest includes any one or more of the following: an address code, a residence, name of a corporate entity, building name, building description, building alias(es), street name, street alias(es), floor number, suite number, apartment number, room number, city, landmark, government agency, government building, municipality and municipal buildings, location information relative to at least one other known landmark, an absolute geographical location, post office, postal code, street name, township, neighborhood, city, county, province or country, or another member's designated entity.

10. The method of claim 2, wherein the step of publishing the commuter information includes publishing to any one or more of the following: a requestor, a member, an owner of an address code, other participating member(s), a corporate entity, a municipality, or government agency, a software application or a designated party as defined by requestor.

11. The method of claim 1, wherein requestor may be any one of the following: an individual, a participating member, a corporate entity, a software application.

12. A system of providing commuter information comprising:
    (a) a memory device; and
    (b) a processor disposed in communication with the memory device, the processor configured to:
       (i) receive a request for access to a unified address enhanced locator system from a requestor;
       (ii) provide access to the unified address enhanced locator system;
       (iii) receive a request for commuter information;
       (iv) request and receive point of interest's address information;
       (v) generate a map of a predetermined radius encompassing the point of interest;
       (vi) determine commuter information that includes schedules for at least one address code for an available public transportation unit that services the point of interest;
       (vii) publish said map, which includes commuter information for at least one address code for an available public transportation unit that services and provides access to the point of interest; and
       (viii) selectively publish periodic updates on a predefined schedule of commuter information that includes schedules for the at least one address code for the available public transportation unit to designated parties as defined by the requestor to receive requestor's commuter information.

13. The system of claim 12 further comprising:
    (a) a memory device; and
    (b) a processor disposed in communication with the memory device, the processor configured to:
       (i) request and receive address information for requestor;
       (ii) determine the optimum route to or from the point of interest based on requestor's address information; and
       (iii) publish commuter information for at least one or a plurality of address codes for available public transportation units that services the point of interest.

14. The system of claim 13 further comprising:
(a) a memory device; and
(b) a processor disposed in communication with the memory device, the processor configured to:
   (i) receive the address information from requestor's wireless device equipped with location determining means; and
   (ii) translate said address information to geographical location.

15. The system of claim 12, wherein commuter information include any one or more of the following: routes, bus numbers, bus names, train names, train numbers, arrival schedules, departure schedules, delayed schedule information, advanced arrival schedule, updates to arrival schedule, updates to departure schedules, peak hour schedules, non-peak hour schedules, weekday schedules, weekend schedules, holiday schedules, ticket offices, geographical location of stations, address codes for stations, and available connections to other public transportation units.

16. The system of claim 12, wherein requestor's address information includes: originating or destination information.

17. The system of claim 12, wherein the address information includes any one or more of the following: an address code, a residence, name of a corporate entity, building name, building description, building alias, street name, street alias, floor number, suite number, apartment number, room number, landmark, government agency, government building, municipalities, municipal buildings, location information relative to at least one other known landmark, an absolute geographical location, post office, postal code, township, neighborhood, city, county, province or country.

18. The system of claim 17, wherein the corporate entity includes any one or more of the following: partnership, corporation, sole proprietorship, individuals doing business as a corporate entity, associations, professional associations, limited liability company, limited liability partnership, a not for profit entity, a for profit entity, an agency, or an organization.

19. The system of claim 12, wherein a public transportation unit any one or more of the following: a bus, taxi, train, subway, heliport, seaport, ferry or an airport.

20. The system of claim 12, wherein the point of interest includes any one or more of the following: an address code, a residence, name of a corporate entity, building name, building description, building alias(es), street name, street alias(es), floor number, suite number, apartment number, room number, city, landmark, government agency, government building, municipality and municipal buildings, location information relative to at least one other known landmark, an absolute geographical location, post office, postal code, street name, township, neighborhood, city, county, province or country, or another member's designated entity.

21. The system of claim 13, wherein the commuter information may be published to any one or more of the following: a requestor, a member, an owner of an address code, other participating member(s), a corporate entity, a municipality, or government agency, a software application or a designated party as defined by requestor.

22. The system of claim 12, wherein requestor may be any one of the following: an individual, a participating member, a corporate entity, a software application.

* * * * *